United States Patent
Klassen et al.

(10) Patent No.: US 10,914,916 B2
(45) Date of Patent: Feb. 9, 2021

(54) NON-ADHESIVE MOUNTING ASSEMBLY FOR A TALL ROCHON POLARIZER

(71) Applicant: ONTO INNOVATION INC., Wilmington, MA (US)

(72) Inventors: Andrew Saul Klassen, San Jose, CA (US); Paul Doyle, Milpitas, CA (US)

(73) Assignee: Onto Innovation Inc., Wilmington, MA (US)

( * ) Notice: Subject to any disclaimer, the term of this patent is extended or adjusted under 35 U.S.C. 154(b) by 297 days.

(21) Appl. No.: 15/910,948

(22) Filed: Mar. 2, 2018

(65) Prior Publication Data
US 2018/0259742 A1    Sep. 13, 2018

Related U.S. Application Data

(60) Provisional application No. 62/468,312, filed on Mar. 7, 2017.

(51) Int. Cl.
| | | |
|---|---|---|
| *G02B 7/18* | (2006.01) | |
| *G02B 5/04* | (2006.01) | |
| *G02B 5/30* | (2006.01) | |

(52) U.S. Cl.
CPC ............. *G02B 7/1805* (2013.01); *G02B 5/04* (2013.01); *G02B 5/3083* (2013.01)

(58) Field of Classification Search
CPC ...... G02B 5/04; G02B 5/3083; G02B 7/1805; G02B 30/25; G02B 7/18; G02B 7/00; G02B 7/02; G02B 7/022; G02B 7/026; G02B 6/3862
See application file for complete search history.

(56) References Cited

U.S. PATENT DOCUMENTS

| | | | |
|---|---|---|---|
| 2,668,469 A | 2/1954 | Gabel | |
| 3,511,556 A | 5/1970 | Ammann | |
| 3,848,973 A * | 11/1974 | Merz ................... | G02B 7/1805 359/831 |
| 3,871,750 A * | 3/1975 | Mecklenborg ......... | G03B 15/00 359/834 |

(Continued)

OTHER PUBLICATIONS

International Search Report and Written Opinion dated Jun. 25, 2018 in International Application No. PCT/US2018/020911. (15 pages).

(Continued)

*Primary Examiner* — Bumsuk Won
*Assistant Examiner* — Balram T Parbadia
(74) *Attorney, Agent, or Firm* — Paradice and Li LLP

(57) ABSTRACT

An elongated rectangular Rochon polarizer, e.g., having a height to width or depth ratio of at least 2.5, is securely held in a non-adhesive mounting assembly. The mounting assembly includes a plurality of compression elements that press the Rochon polarizer against corresponding reference points to properly align the Rochon polarizer within the mounting assembly. Moreover, air gaps between the Rochon polarizer and the sidewalls of the mounting assembly are provided to minimize thermal conduction between the mounting assembly and the Rochon polarizer and to provide thermal convection to cool the Rochon polarizer, thereby reducing risk of catastrophic delamination of the Rochon polarizer due to thermal effects.

27 Claims, 11 Drawing Sheets

(56) References Cited

U.S. PATENT DOCUMENTS

| | | | | |
|---|---|---|---|---|
| 4,268,123 A * | 5/1981 | Mesco | ............... | G02B 7/182 |
| | | | | 248/488 |
| 4,727,859 A * | 3/1988 | Lia | ............... | A61B 1/00101 |
| | | | | 356/241.5 |
| 4,929,073 A * | 5/1990 | La Plante | ............... | G02B 7/1825 |
| | | | | 359/819 |
| 6,472,651 B1 | 10/2002 | Ukai | | |
| 7,878,665 B2 * | 2/2011 | Imoto | ............... | G02B 7/022 |
| | | | | 353/100 |
| 2002/0184919 A1 * | 12/2002 | Otsuki | ............... | C03C 27/02 |
| | | | | 65/39 |
| 2003/0043476 A1 * | 3/2003 | Snively | ............... | G02B 27/62 |
| | | | | 359/819 |
| 2003/0067693 A1 * | 4/2003 | Imoto | ............... | B60R 1/00 |
| | | | | 359/831 |
| 2003/0076602 A1 * | 4/2003 | Nishikawa | ............... | G03F 7/70866 |
| | | | | 359/819 |
| 2003/0147160 A1 * | 8/2003 | Endoh | ............... | G02B 7/1825 |
| | | | | 359/838 |
| 2003/0213889 A1 * | 11/2003 | Miura | ............... | F16C 32/00 |
| | | | | 248/683 |
| 2003/0234916 A1 * | 12/2003 | Watson | ............... | G02B 7/182 |
| | | | | 355/53 |
| 2004/0150898 A1 * | 8/2004 | Ho | ............... | G02B 7/004 |
| | | | | 359/811 |
| 2004/0218289 A1 * | 11/2004 | Kino | ............... | G03F 7/7095 |
| | | | | 359/819 |
| 2004/0218290 A1 * | 11/2004 | Ehrne | ............... | G02B 27/102 |
| | | | | 359/831 |
| 2005/0078386 A1 * | 4/2005 | Takabayashi | ............... | G02B 7/026 |
| | | | | 359/819 |
| 2006/0092512 A1 * | 5/2006 | Shioya | ............... | G02B 5/003 |
| | | | | 359/487.03 |
| 2011/0235199 A1 * | 9/2011 | Keicher | ............... | B23K 26/144 |
| | | | | 359/831 |
| 2013/0070331 A1 | 3/2013 | Dewa et al. | | |
| 2013/0293964 A1 * | 11/2013 | Marr | ............... | G02B 7/182 |
| | | | | 359/618 |
| 2014/0111849 A1 * | 4/2014 | Xuegong | ............... | G02F 1/133788 |
| | | | | 359/352 |
| 2014/0346692 A1 * | 11/2014 | Watanabe | ............... | B29D 11/00432 |
| | | | | 264/1.7 |
| 2016/0084281 A1 * | 3/2016 | Lamontagne | ............... | F16B 43/004 |
| | | | | 248/314 |
| 2017/0223243 A1 * | 8/2017 | Nakamura | ............... | G02B 7/023 |

OTHER PUBLICATIONS

Karl Lambrect: "Karl Lambrect Corporation Magnesium Flouride Rochon Catalog Number Clear Aperture Diameter in mm Angular Separation in degrees Mount Dimensions (Inches)", Online Catalog, Nov. 3, 2016. (2 pages).

* cited by examiner

NON-ADHESIVE MOUNTING ASSEMBLY FOR A TALL ROCHON POLARIZER

CROSS REFERENCE TO RELATED APPLICATIONS

This application claims priority under 35 USC 119 to U.S. Provisional Application No. 62/468,312, entitled "NON-ADHESIVE MOUNTING ASSEMBLY FOR A TALL ROCHON POLARIZER IN SEMICONDUCTOR METROLOGY," filed Mar. 7, 2017, which is incorporated herein by reference in its entirety.

BACKGROUND

A Rochon polarizer is a common optical device that receives a single beam of light and produces two separate rays, one of which is deviated and the other is undeviated from the original beam path. FIG. 1 illustrates a conventional Rochon polarizer 10 with an approximately cubic form factor, e.g., the length, width, and height dimensions are approximately equal. A Rochon polarizer, such as Rochon polarizer 10, is made of two birefringent crystal prisms 12 and 14, such as calcite or other appropriate materials, that are bonded together to be in optical contact. As illustrated in FIG. 1, a Rochon polarizer receives an incoming light beam 16, which includes ordinary and extraordinary rays. The ordinary and extraordinary rays are collinear through the first prism 12. The extraordinary rays 16 refract at the interface between the two prisms 12 and 14 causing the extraordinary rays to deviate from the original beam path. The ordinary rays 18, however, do not experience a change in the refractive index at the interface between the two prisms 12 and 14 and pass through the second prism 14 without deviation.

A Rochon polarizer has many applications, including use in optical metrology devices. A Rochon polarizer may be used in optical metrology devices, for instance, to orient the polarization of light with respect to a grating or similar structure to be measured. On a semiconductor structure, where critical dimensions need to be measured, reflectivity at normal incidence changes with polarization direction. Each angle of rotation of the Rochon polarizer creates a virtual cross section of the structure. Multiple cross sections, created by rotating the Rochon polarizer to different angles, can allow the structure to be virtually recreated and analyzed. In applications, such as optical metrology, the Rochon polarizer must be precisely positioned and held in a stable manner. To meet the rigid clamping requirements, conventionally a Rochon polarizer is mounted in a metal housing using adhesive. FIGS. 2A, 2B, and 2C, for example, illustrate an isometric view, top view and section view of the cubic Rochon polarizer 10 conventionally mounted to a metal housing 20 using adhesive. As illustrated, the metal housing 20 surrounds and extends upward to cover the bottom half, i.e., 50, of the height of the Rochon polarizer 10. An adhesive 22 is applied in recesses 24 in the metal housing 20 at the sides of the Rochon polarizer 10 and the adhesive 22 flows between the metal housing 20 and the Rochon polarizer 10 bonding the two together.

SUMMARY

An elongated rectangular Rochon polarizer, e.g., having a height to width or depth ratio of at least 2.5, is securely held in a non-adhesive mounting assembly. The mounting assembly includes a plurality of compression elements that press the Rochon polarizer against corresponding reference points to properly align the Rochon polarizer within the mounting assembly. Moreover, air gaps between the Rochon polarizer and the sidewalls of the mounting assembly are provided to minimize thermal conduction between the mounting assembly and the Rochon polarizer and to provide thermal convection to cool the Rochon polarizer, thereby reducing risk of catastrophic delamination of the Rochon polarizer due to thermal effects.

In one implementation, an apparatus includes a Rochon polarizer that has a height dimension that is parallel with an undeviated center ray that passes through the Rochon polarizer, the height dimension is at least 2.5 times greater than a width dimension or depth dimension, a mounting assembly that holds the Rochon polarizer so that the undeviated center ray and deviated rays passing through the Rochon polarizer are unobstructed, the mounting assembly comprising: a plurality of sidewalls that extends along the height dimension of the Rochon polarizer; a first set of reference points on a first sidewall that contact a first side of the Rochon polarizer; a second set of reference points on a second sidewall that contact a second side of the Rochon polarizer; a third set of reference points on a base that contacts a first end of the Rochon polarizer; a first set of compression elements that contact a third side of the Rochon polarizer that is opposite the first side of the Rochon polarizer and press the Rochon polarizer against the first set of reference points; a second set of compression elements that contact a fourth side of the Rochon polarizer that is opposite the second side of the Rochon polarizer and press the Rochon polarizer against the second set of reference points.

In one implementation, an apparatus includes a Rochon polarizer that has a height dimension that is parallel with an undeviated center ray that passes through the Rochon polarizer, the height dimension is at least 2.5 times greater than a width dimension or depth dimension; a mounting assembly that holds the Rochon polarizer, wherein the undeviated center ray and deviated rays passing through the Rochon polarizer are unobstructed by the mounting assembly, the mounting assembly comprising: a plurality of sidewalls that extends along the height dimension of the Rochon polarizer, a base coupled to the sidewalls that covers a portion of a first end of the Rochon polarizer; a plurality of pads on at least two of the sidewalls and the base, the plurality of pads contact at least a first side and a second side and the first end of the Rochon polarizer; a plurality of compression elements on at least two of the sidewalls, the plurality of compression elements contact at least a third side and a fourth side of the Rochon polarizer, wherein each compression element presses the Rochon polarizer against a corresponding pad to hold the Rochon polarizer in the mounting assembly; wherein the plurality of pads and the plurality of compression elements hold the Rochon polarizer so that there are air gaps between the at least two sidewalls and the Rochon polarizer and between the base and the Rochon polarizer.

In one implementation, a method of mounting a Rochon polarizer that has a height dimension that is at least 2.5 times greater than a width dimension or depth dimension, includes positioning the Rochon polarizer against a first set of reference points on a first sidewall of a mounting assembly, against a second set of reference points on a second sidewall of the mounting assembly, and against a third set of reference points on a base of the mounting assembly; and pressing the Rochon polarizer against the first set of reference points with a first set of compression elements of the mounting assembly and against the second set of reference points with a second set of compression elements of the mounting assembly, wherein the first set of compression elements and the second set of compression elements provide air gaps between the Rochon polarizer and the mounting assembly.

DETAILED DESCRIPTION

The specific design of a Rochon polarizer may be customized both in prism size and shape, as well as materials, to control various optical properties of the Rochon polarizer, such as the deviation angle. Regardless of the specific design, the Rochon polarizer must be securely mounted in an assembly to be stably positioned, e.g., within an optical metrology device. Certain designs of the Rochon polarizer, however, render the polarizer sensitive to, e.g., temperature and pressure, making conventional mounting assemblies unsuitable for holding the polarizer. Accordingly, for some designs of a Rochon polarizer, a mounting assembly should securely hold the polarizer while protecting the polarizer from undesirable thermal or pressure effects.

Figure 1:
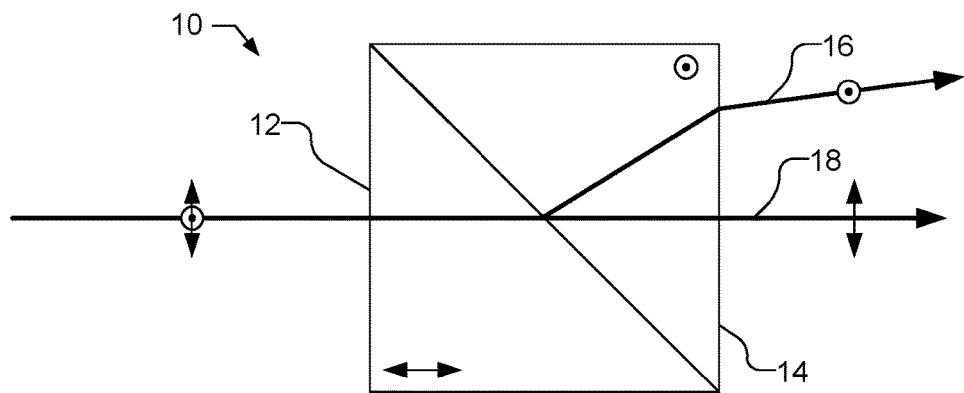
FIG. 1 illustrates a conventional Rochon polarizer with an approximately cubic form factor, e.g., the length, width, and height dimensions are approximately equal.
Figure 3:
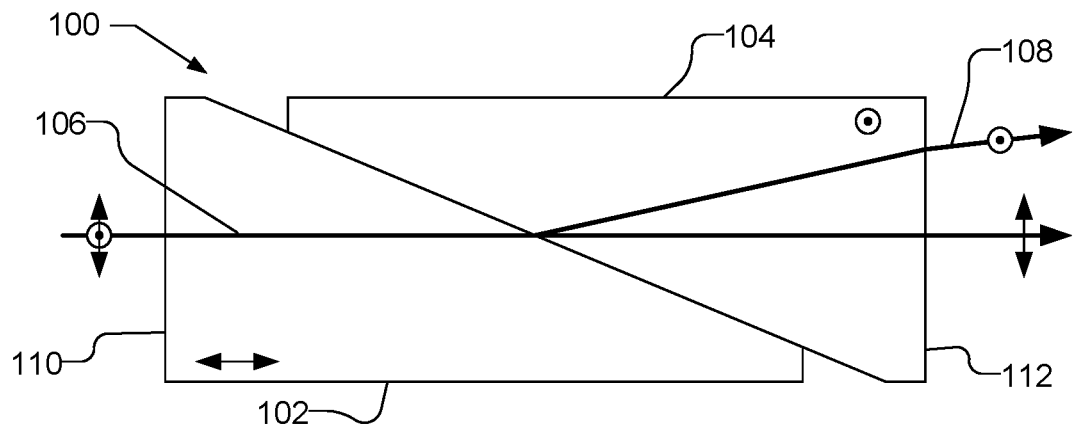
FIGS. 3 and 4 illustrate a side view and a perspective view, respectively, of a tall Rochon polarizer that has been designed with an elongated rectangular shape.
Figure 4:
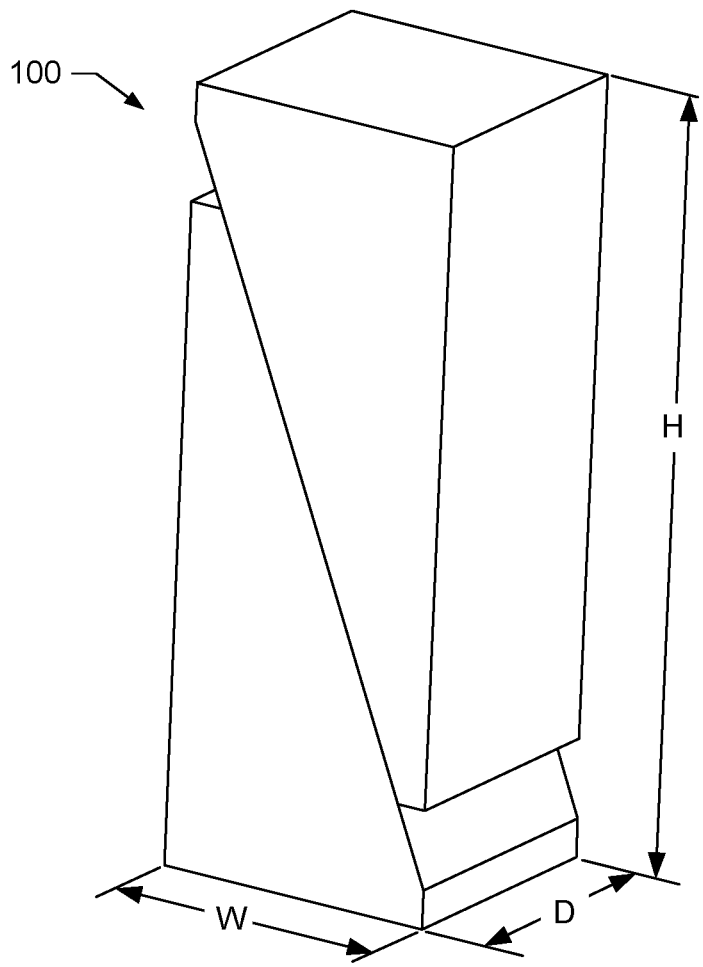

FIGS. 3 and 4 illustrate a Rochon polarizer 100 that has been designed with an unusually elongated rectangular shape. The basic operation of Rochon polarizer 100 is similar to the cubic Rochon polarizer 10, illustrated in FIG. 1, but the elongated rectangular shape provides optical parameters that differ from the cubic shape, which may be desirable for certain optical uses. Rochon polarizer 100 includes two birefringent crystal prisms 102 and 104 that are bonded in optical contact. The birefringent crystal prisms 102 and 104, may be, e.g., calcite, magnesium fluoride, BBO ($BaB_2O_4$), Lithium Tetraborate ($Li_2B_4O_7$), or other appropriate materials, and may be bonded together, e.g., using a UV-curing adhesive or "optical contact bonding" that relies on the van der Waal's force to hold the prisms 102 and 104 together. The unusually elongated rectangular shape of the Rochon polarizer 100 has a height H dimension that is parallel with the undeviated center ray 106 and that is at least 2.5 times greater than its width W dimension or depth D dimension. For example, the height H may be 29.5 mm, the width W may be 11 mm, and the depth D may be 10 mm, although other dimensions may be used. The dimensions of the rectangular Rochon polarizer 100 may be expressed as a ratio of approximately 2.5:1 or greater, such as approximately 3:1. The Rochon polarizer 100 may be referred to herein as "tall" due to the ratio of the dimensions of its elongated rectangular shape.

Figures 2A, 2B, 2C:
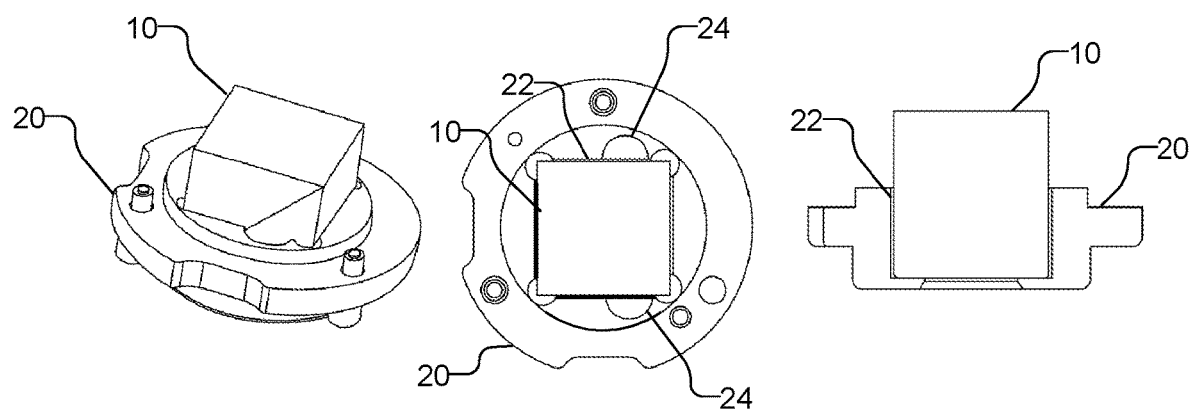
FIGS. 2A, 2B, and 2C illustrate an isometric view, top view and section view of the cubic Rochon polarizer mounted to a metal housing using adhesive.

As illustrated in FIG. 3, the light rays are received and emitted by the Rochon polarizer 100 through the relatively small, nearly square ends 110 and 112. A mounting assembly for the Rochon polarizer 100 must allow light to enter and the undeviated center ray 106 and deviated ray 108 to exit the Rochon polarizer 100 without obstruction. Additionally, to avoid excessive vibration of the tall Rochon polarizer, the polarizer should be supported over a greater length, i.e., along the height dimension, than is conventionally used to hold Rochon polarizers, such as that illustrated in FIGS. 2A, 2B, and 2C. Attaching the tall Rochon polarizer to the mounting assembly by only the bottom half, i.e., 50% of the height of the Rochon polarizer, would allow excessive vibration of the polarizer and would be ineffective for holding the polarizer stable. Consequently, the Rochon polarizer 100 must be supported by the mounting assembly along more than 50% of its height H dimension, for example at least 75%, 90%, or 100%. Thus, it is desirable to partly or fully encapsulate the Rochon polarizer 100 for a robust and rigid mounting.

Additionally, during shipping and in operation, such as when mounted in optical metrology devices, Rochon polarizers are often subject to movement or shock. If the Rochon polarizer were to slip in the mounting assembly, all alignments would be lost and the optical metrology device would require extensive recalibration. Thus, the Rochon polarizer 100 should be rigidly held so that a shock during shipping or movement during use cannot dislodge the polarizer from the mounting assembly. To hold the Rochon polarizer 100 in a robust manner, by way of example but not limitation, the mounting assembly should hold the Rochon polarizer 100 so that a 20 g shock will not dislodge or alter the alignment of the polarizer within the mounting assembly.

Figure 5:
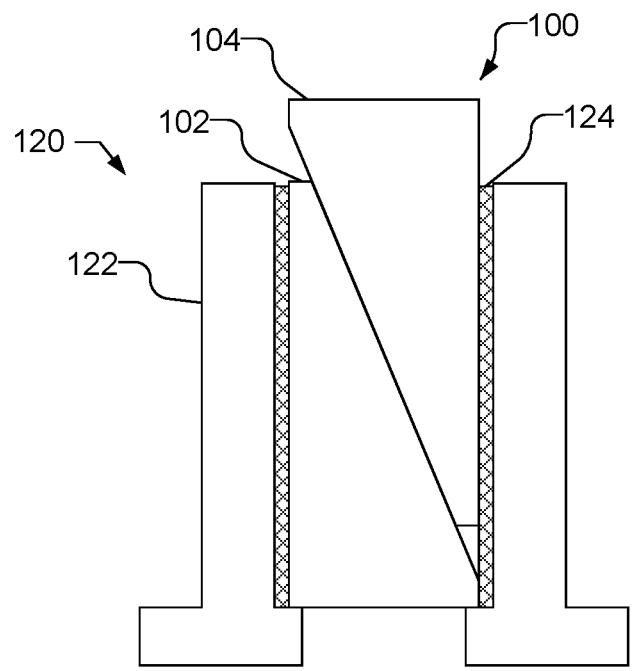
FIG. 5 illustrates a cross section view of the tall Rochon polarizer adhesively mounted in a mounting assembly.

FIG. 5 illustrates a cross section view of the tall Rochon polarizer 100 mounted in a mounting assembly 120 that includes metal housing 122 that supports the Rochon polarizer 100 over 50% of the height of the sides of the polarizer. The mounting assembly 120 uses an adhesive 124 to hold the Rochon polarizer 100 within the metal housing 122. Thus, other than the additional height of the Rochon polarizer 100 that is supported by the metal housing 122, the Rochon polarizer 100 is mounted in metal housing 122 in a manner similar to how the cubic Rochon polarizer 10 is mounted in metal housing 20 in FIGS. 2A, 2B, and 2C. The adhesive 124 used in mounting assembly 120 for example, may be a Room-Temperature-Vulcanizing silicone (RTV) adhesive that is injected or spread between the Rochon polarizer 100 and the walls of the metal housing 122.

While the mounting assembly 120 holds the Rochon polarizer 100 in a robust manner, the use of an adhesive to hold the tall Rochon polarizer 100 has been determined by the inventors to be unacceptable as this retention method suffers from several problems. First, thermal variation may cause the Rochon polarizer 100 or the metal housing 122 to expand or contract, which may cause unwanted forces to be applied to the polarizer. The adhesive bonds the polarizer to the metal housing 122, which is a rigid and non-compliant fixture. Accordingly, thermal expansion or contraction of the Rochon polarizer 100 or the metal housing 122 may subject the polarizer to forces that increase or decrease significantly with temperature. One undesirable, but relatively less harmful effect of these forces is a temporary change in optical properties of the Rochon polarizer 100. Another more catastrophic effect of these forces is that the forces may cause the two prisms 102 and 104 of the Rochon polarizer 100 to delaminate, e.g., the optical contact between the prisms 102 and 104 is broken. The separation of the prisms 102 and 104 is permanent and requires replacement of the Rochon polarizer 100. A second problem encountered due to the use of adhesive in the mounting assembly 120 is that the adhesive 124 may expand or contract during the curing process, which may also apply unwanted forces on the Rochon polarizer 100. A third problem is that the adhesive 124 outgasses during the curing processes, and the outgassed vapor may adversely affect the bond between the prisms 102 and 104. A fourth problem is that the adhesive 124 provides a thermally conductive path to the Rochon polarizer 100 so that environmental heat can more easily transfer to the polarizer, which may cause the two prisms 102 and 104 to delaminate. A fifth problem is that the adhesive 124 insulates the Rochon polarizer 100 so that cooling air cannot circulate around the polarizer and, consequently, the Rochon polarizer 100 may heat up and delaminate. This problem is exacerbated by the metal housing 122 and adhesive 124 covering the majority of the height of the tall Rochon polarizer 100.

For physical reasons not described here, it is not possible to bond the two prisms 102 and 104 of the tall Rochon polarizer 100 as strongly as the prisms in a cubical Rochon polarizer can be bonded. Consequently, variations in temperature or pressure that may be tolerated by a cubical Rochon polarizer may cause a tall Rochon polarizer to delaminate rendering it useless. In fact, it has been found that temperatures produced by a technician's hand while handling the Rochon polarizer 100 with gloves, e.g., during assembly, may be sufficient to cause delamination. Accordingly, it is desirable for the mounting assembly for the Rochon polarizer to sufficiently protect the polarizer from thermal variations that may occur during assembly as well as during use. Thus, the mounting assembly should produce little thermal conduction from the metal housing to the Rochon polarizer, while providing good convective heat transfer from the Rochon polarizer to the environment.

Figure 6:
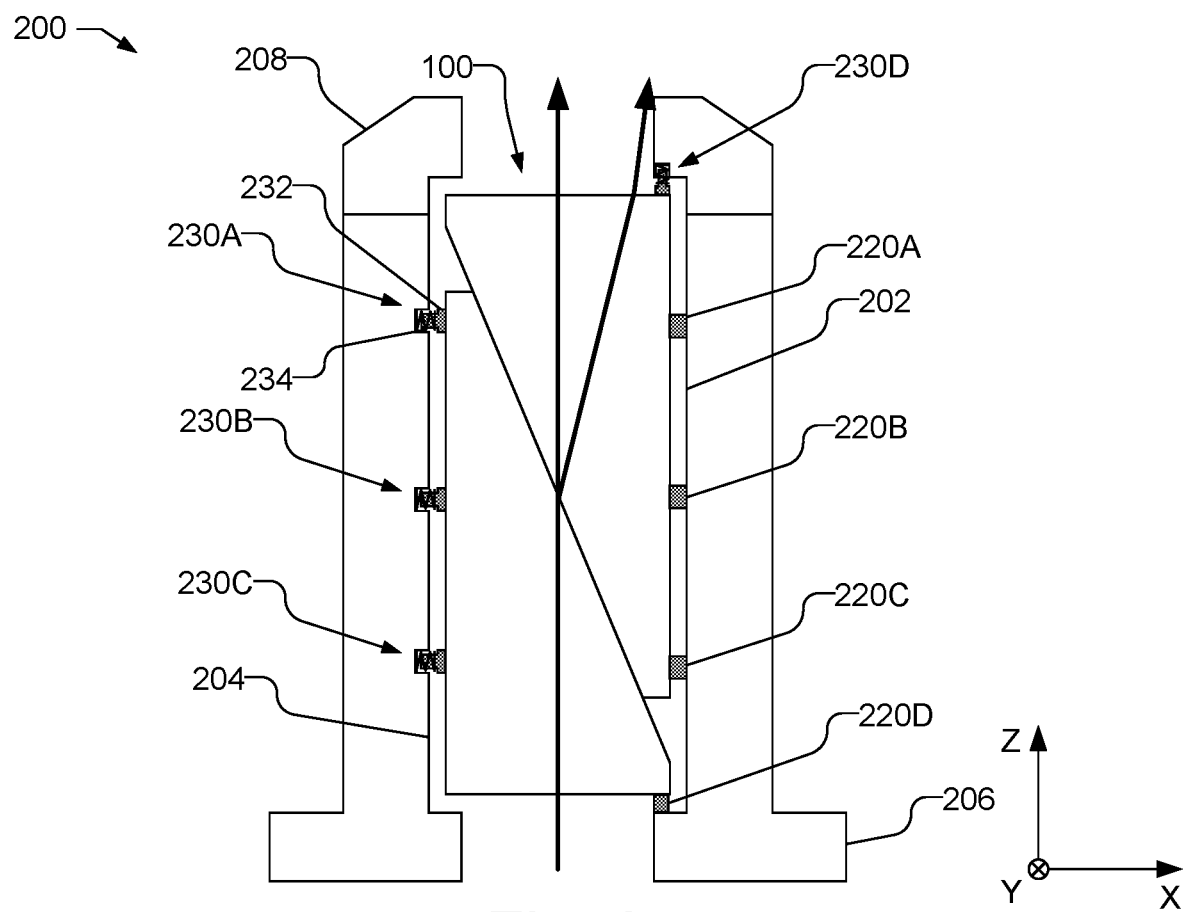
FIG. 6 illustrates a cross section view of a non-adhesive mounting assembly for the tall Rochon polarizer.

FIG. 6 illustrates a cross section view of a non-adhesive mounting assembly 200 for the tall Rochon polarizer 100. The mounting assembly 200 includes a plurality of sidewalls that mechanically support and hold the Rochon polarizer 100 along its height dimension of the Rochon polarizer 100. The mounting assembly 200 is illustrated as including sidewalls 202 and 204, as well as a cap and base 206. Thus, the Rochon polarizer 100 is illustrated as being fully encapsulated by the mounting assembly 200, while apertures in the cap 208 and base 206 permit light to pass through the Rochon polarizer 100.

Figure 7C:
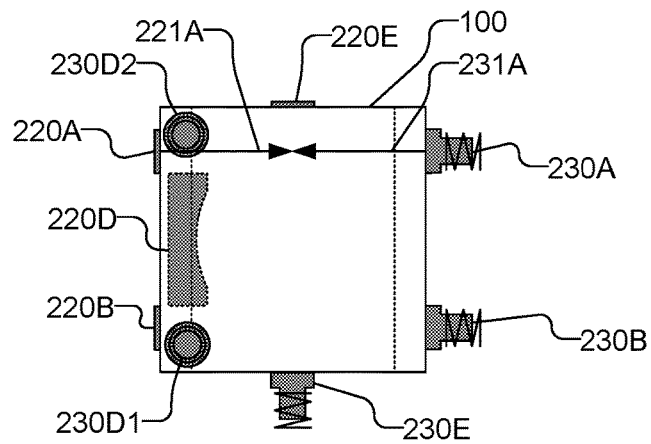
FIGS. 7A, 7B, and 7C illustrate a side view, front view, and top view, respectively, of a Rochon polarizer mechanically held with reference points and opposing compression elements in three dimensions.
Figures 7A, 7B:
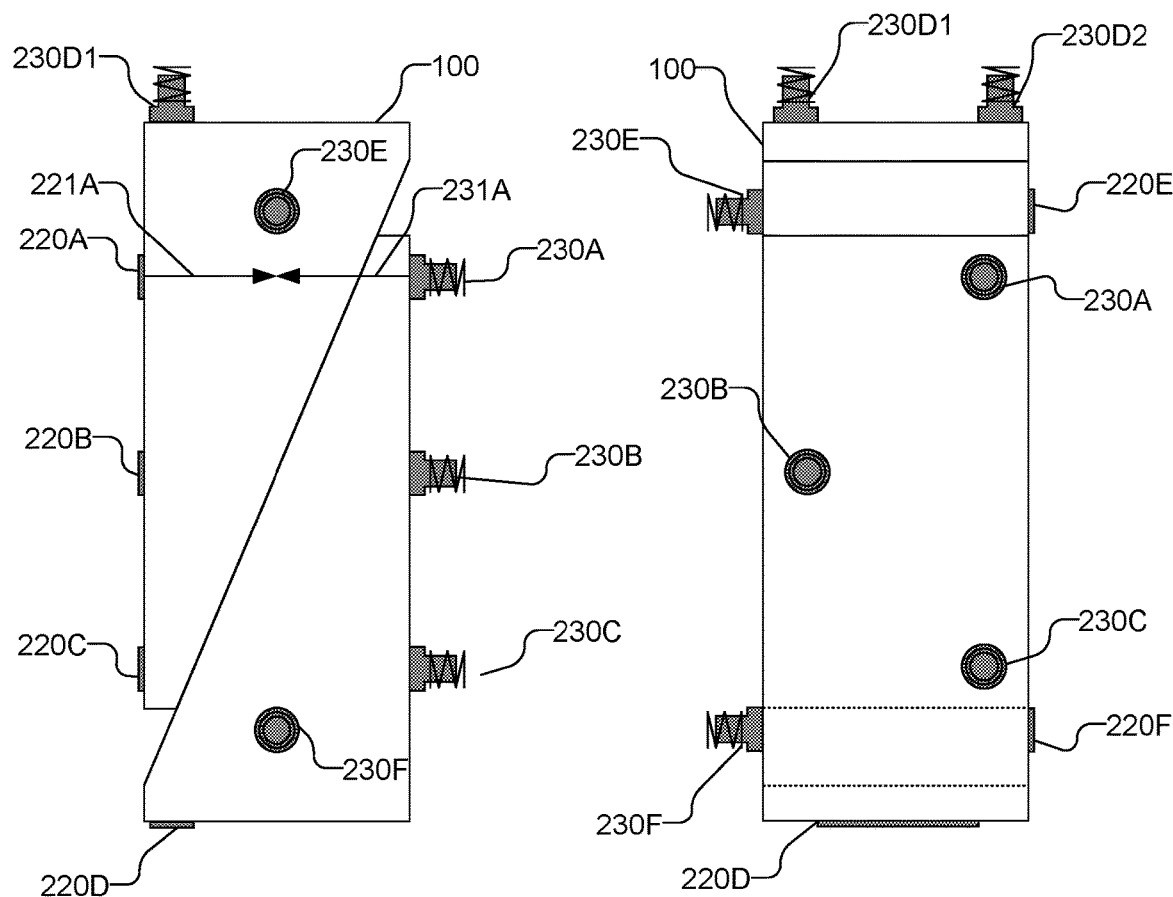

The Rochon polarizer 100 is mechanically mounted in the mounting assembly 200 using a number of reference points and a number of opposing compression elements that are on opposite walls of the Rochon polarizer 100. FIGS. 7A, 7B, and 7C, for example, illustrate a side view, front view, and top view of the Rochon polarizer 100 with reference points 220A, 220B, 220C, 220D, 220E, and 220F (sometimes collectively or individually referred to as reference points 220) opposing compression elements 230A, 230B, 230C, 230D (illustrated as 230D1 and 230D2), 230E, and 230F (sometimes collectively or individually referred to as compression elements 230). The reference points 220 may be, e.g., raised pads, and thus are sometimes referred to herein as pads 220. The reference points 220 are features in the X, Y, and Z axes against which the Rochon polarizer 100 is held to align the Rochon polarizer 100 within the mounting assembly 200, and, accordingly, reference points 220 may also be referred to as datums. The compression elements 230 may be, e.g., metal or non-metal springs, such as a coil or leaf springs, or foam or rubber pads, or other appropriate materials that mechanically provide a force that presses the Rochon polarizer 100 against the reference points 220.

As illustrated, the compression elements 230 may be positioned opposite to corresponding pads 220, e.g., they may be disposed at opposing positions on opposite sides of the polarizer. In other words, as illustrated by compression element 230A and corresponding pad 220A, each compression element 230 and corresponding pad 220 may be positioned to produce collinear and opposing static forces (illustrated by arrows 231A and 221A, respectively) on the Rochon polarizer 100. The forces are normal to each of the parallel surfaces of the Rochon polarizer, and are aligned so that the forces are collinear but acting in opposite directions to produce a static equilibrium of force on the Rochon polarizer 100 with minimal or, ideally, zero applied moment so that little or no bending stress is introduced to the polarizer. The pads 220 and compression elements 230 may be sparsely distributed over the surfaces of the Rochon polarizer 100 to distribute the forces applied to the polarizer over the height of the sidewalls, e.g., to support and stabilize the tall Rochon polarizer from vibration. If desired, additional pads and corresponding compression elements may be present on the sidewalls.

As illustrated in FIG. 6, the pads 220A, 220B, and 220C may be located on a sidewall 202 and pad 220D may be located on a surface of a base 206 of the mounting assembly 200. The compression elements 230A, 230B, and 230C may be mounted on a sidewall 204 and compression element 230D may be mounted on a surface of a cap 208 of the mounting assembly 200. The pads 220E and 220F and compression elements 230E and 230F, illustrated in FIGS. 7A, 7B, and 7C, may be located on other sidewalls of the mounting assembly. If desired, the pad 220D may be located on a surface of a cap 208 and the compression element 230D may be mounted on a surface of the base 206. Thus, the Rochon polarizer 100 is mechanically held within the mounting assembly by the forces applied by the compression elements 230 along the three axes X, Y, and Z. In some embodiments, the pad 220D and opposing compression element 230D, which apply force along the Z axis, may be eliminated relying on the pads 220 and compression elements 230 applying forces in the X and Y axes to fully support and rigidly hold the Rochon polarizer 100 within the mounting assembly. If desired, a temporary restraining system, such as a temporary cap, may be used to hold the Rochon polarizer 100 along the Z axis, e.g., during assembly, shipping, and installation. The temporary restraining system may be removed from the Rochon polarizer 100, e.g., during a final calibration process, so that the Rochon polarizer 100 is held with compression elements 230 applying forces in the X and Y axes. Alternatively, a small amount of adhesive may be applied to the base 206 to hold the Rochon polarizer 100 along the Z axis, while pads 220 and compression elements 230 mechanically hold the Rochon polarizer 100 along the X and Y axes. The use of a small amount of adhesive on the base 206 may be permissible if it does not produce delaminating forces on the polarizer.

The force of the compression elements 230 presses the Rochon polarizer 100 against the opposite pads 220 to rigidly position the Rochon polarizer 100 within the mounting assembly 200 using only a small amount of total contact area. An air gap is provided by the mounting assembly 200 and the Rochon polarizer 100 that permits air to circulate around the Rochon polarizer 100 within the mounting assembly 200 to enable thermal convection to cool the polarizer during assembly and use. Additionally, with use of only a small amount of contact area, there is little thermal conduction and the air gap insulates the Rochon polarizer 100 from the mounting assembly 200. Further, by avoiding the use of adhesive, the risks associated with adhesive outgassing and shrinkage or expansion during curing are also implicitly eliminated. Accordingly, the tall Rochon polarizer 100, e.g., with a height to width or depth ratio of 2.5:1 or greater, may be rigidly held in the mounting assembly 200 with less risk of catastrophic delamination of the prisms due to thermal effects.

The reference points 220, e.g., pads, may be manufactured from one or more materials that are poor conductors of heat, such as polyether ether ketone (PEEK), polyetherimide (Ultem®), nylon, or other polymer material. The pads 220 may be mounted to the sidewalls and base 206 of the metal housing using an appropriate adhesive, such as RTV, or may be press fit into the sidewalls. It should be noted that as the adhesive is not in contact with the Rochon polarizer 100 and cures prior to introduction to the Rochon polarizer 100 so the problems with adhesive discussed above may be eliminated or reduced by the use of adhesive to mount the pads 220 to the sidewalls. Press fitting the pads 220 into counterbores in the sidewalls eliminates any issues that may be presented with the use of adhesive. Moreover, the pads 220 may be machined into the sidewalls and, thus, may be integrally formed with the sidewall. The size of the pads 220 is relatively small, e.g., a 1 mm$^2$ to 7 mm$^2$, e.g., depending on the size of the Rochon polarizer 100, so that the pads 220 do not contact a large area of the surface of the polarizer, which reduces heat transfer through the pads 220 and provides a greater amount of surface area for air to pass over the polarizer. It is desirable for the size of the pads 220 to be as small as possible within the limitations of the material type of the pads 220, e.g. metal, polymer, etc., without causing damage or marring the polarizer material.

The compression elements 230 may be or may include springs, such as a coil spring or a leaf spring, manufactured from steel or non-steel materials, such as urethane or other appropriate materials. If desired, the compression elements 230 may not be a mechanical spring, but may be or may include pads manufactured from foam, rubber, or other elastic material that may be compressed and produce a desired amount of force on the polarizer. For example, as illustrated in FIG. 6, the compression elements 230 are formed by buttons 232 that are pressed against the Rochon polarizer 100 with wire coil springs 234. The buttons 232 and springs 234 may be held in counterbores in the sidewall 204 and the cap 208. Similar to pads 220, the buttons 232 may be manufactured from one or more materials that are poor conductors of heat, such as polyether ether ketone (PEEK), polyetherimide (Ultem®), nylon, or other polymer material. Additionally, as the buttons 232 are small they do not contact a large area of the polarizer surface, which reduces heat transfer to the Rochon polarizer 100 through the buttons 232. The wire springs 234 may be manufactured, e.g., from spring steel, which is conductive to heat, but because the diameter of the springs 234 is small, only a small amount of heat may be conducted to the buttons 232.

Figure 8:
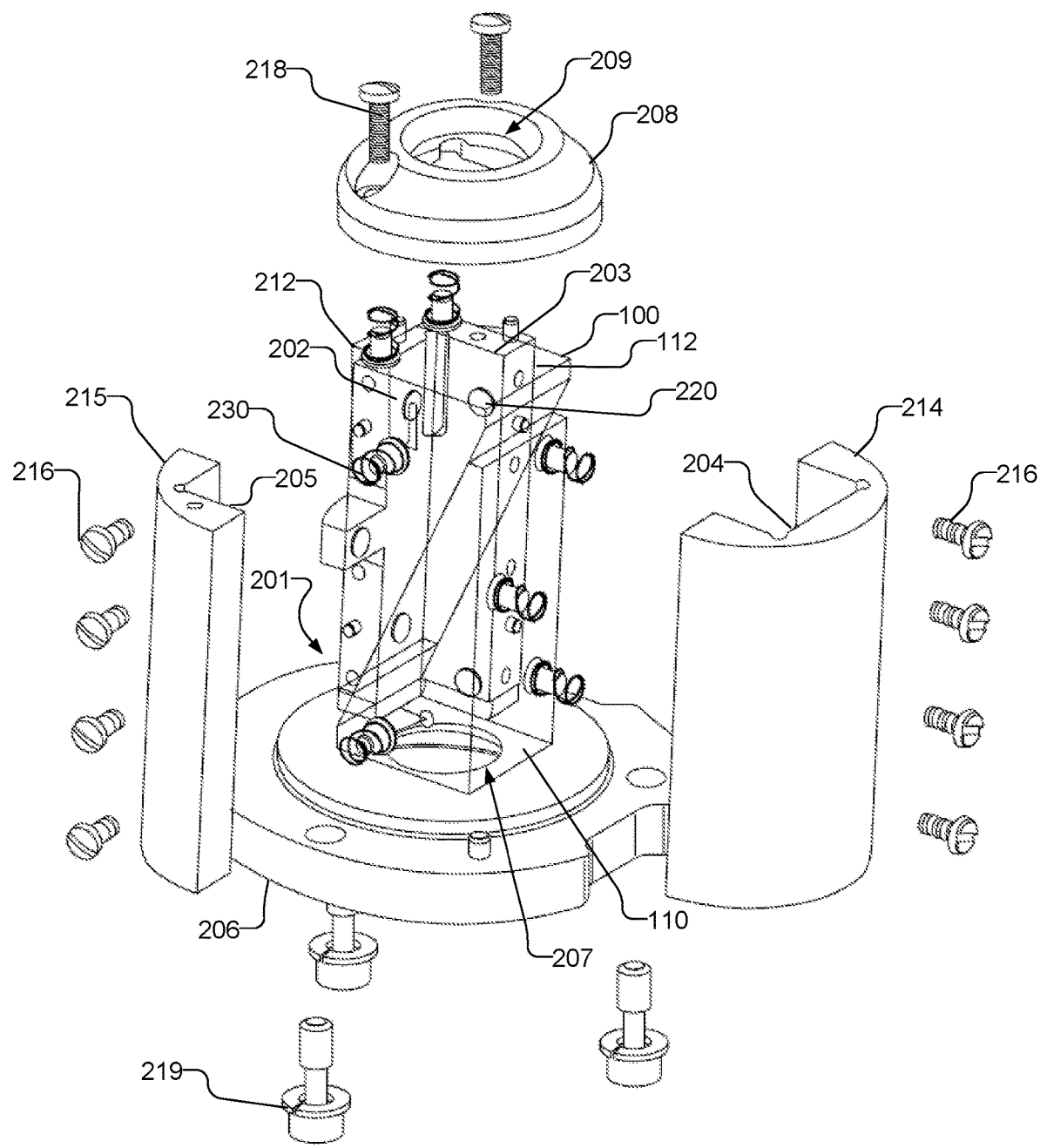
FIG. 8 is an exploded illustration of the non-adhesive mounting assembly for the Rochon polarizer.

FIG. 8 is a more detailed, exploded illustration of the non-adhesive mounting assembly 200 for the Rochon polarizer 100, which is illustrated as transparent in order to show the physical relationships between elements. As illustrated, the mounting assembly 200 includes a base fixture 201 that includes the base 206 and a plate 212 that is integrally formed with or rigidly affixed to the base 206 and that includes sidewall 202 and sidewall 203. The pads 220 may be positioned on the base fixture 201, i.e., on sidewalls 202 and 203 and the base 206. The mounting assembly 200 further includes a plate 214 with sidewall 204 and a plate 215 with sidewall 205, which may be affixed to the base fixture 201 using screws 216, or similarly appropriate mechanism. The cap 208 may be affixed to the base fixture 201 using screws 218, or appropriate attachment mechanism. The compression elements 230 may be positioned on sidewalls 204 and 205 and the cap 208. When the mounting assembly 200 is assembled, the Rochon polarizer 100 is enclosed except for the distal ends 110 and 112, which are exposed by apertures 207 and 209 in the base 206 and cap 208, respectively, that may be centered with respect to the undeviated center ray passing through Rochon polarizer 100 to allow functional light rays, i.e., the undeviated and deviated rays, to pass through the Rochon polarizer 100.

The mounting assembly 200, including the base fixture 201, and plates 214 and 215, may be manufactured from a rigid material such as aluminum, steel, aluminum-silicon, metal-matrix, or a polymer, or another appropriately rigid material. The mounting assembly 200 is assembled, e.g., using screws 216 and 218, and may include a lock washer or Belleville washer to lock the screws in place after installation, thereby ensuring the mounting assembly 200 will not vibrate loose during operation. If desired, additional or fewer screws may be used. Further, in place of screws, one or more of the base fixture 201, plates 214 and 215 and cap 208 may be assembled using mechanical clamps, adhesive, or any other mechanism that is sufficient to ensure the mounting assembly will not vibrate loose during operation. The mounting assembly 200 may be removably mounted to the optical system of an optical metrology device using installation screws 219.

Figure 9:
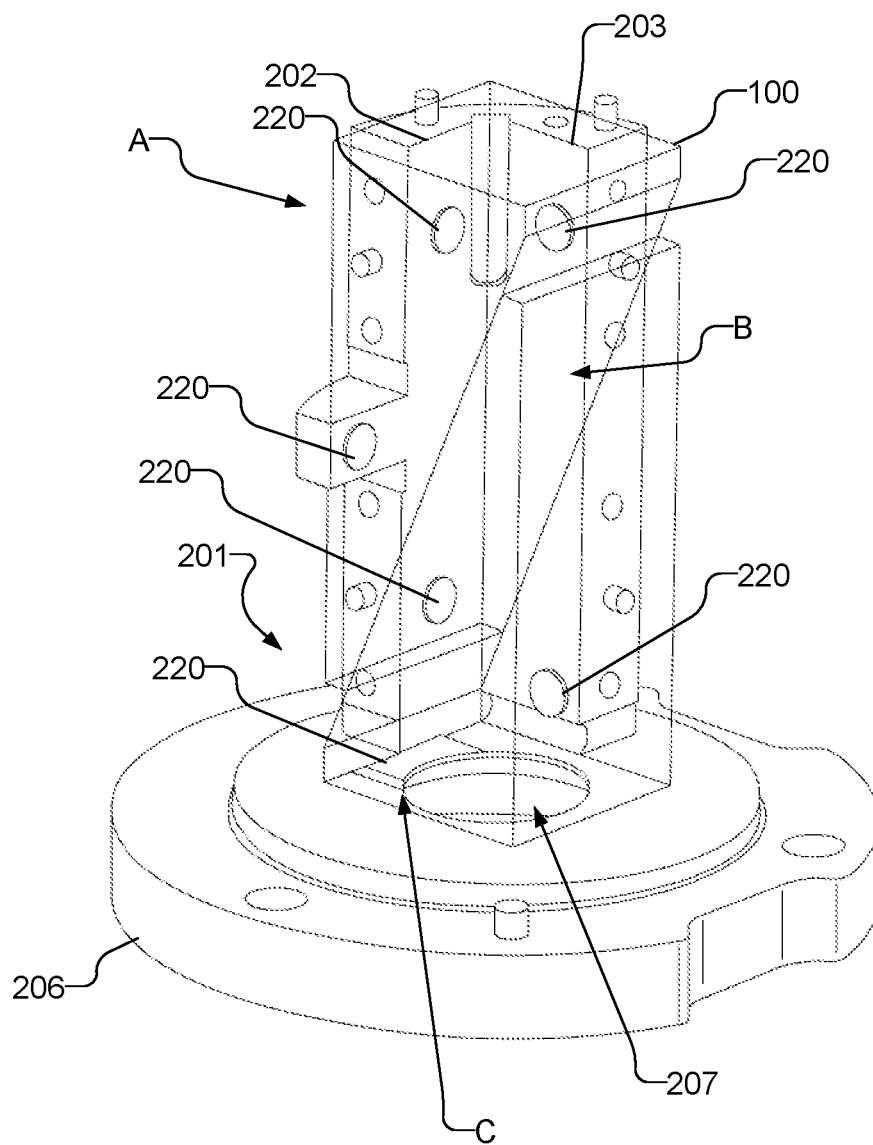
FIG. 9 illustrates a perspective view of a base fixture of the mounting assembly from FIG. 8.

FIG. 9 illustrates a perspective view of the base fixture 201 with the Rochon polarizer 100 illustrated as transparent in order to show the physical relationships between elements. During assembly, the Rochon polarizer 100 may be positioned in the base fixture 201 using the pads 220 as three primary datums defined using the convention A, B, and C, to properly align the Rochon polarizer 100 in the base fixture 201. Datum A may be formed by three pads 220 on sidewall 202, datum B may be formed by two pads 220 on sidewall 203, and datum C may be formed by one pad 220 on the base 206. The use of three primary datums A, B, and C assures that the tall Rochon polarizer 100 is correctly positioned with respect to the base fixture 201, e.g., so that the center of the Rochon polarizer (or the undeviated center ray passing through the Rochon polarizer) is aligned with center of aperture 207 in the base 206. The use of three pads 220 for datum A, two pads 220 for datum B, and one pad 220 for datum C is advantageous as it enables the Rochon polarizer to be accurately positioned and rigidly held using only a small contact area which reduces the amount of thermal conduction while promoting air flow between the Rochon polarizer 100 and the sidewalls 202 and 203. If desired, however, additional or fewer pads 220 may be used to position Rochon polarizer 100 with respect to the base fixture 201. The permissible contact area of the pads 220 may be determined by allowable thermal conductivity specific to the application and the materials used. For instance, the Rochon polarizer may have a specific temperature at which it may delaminate, and the smaller the pads are, the lower the thermal conductivity to the polarizer will be. The resulting heat transfer to the polarizer is a function of the amount of contact, and the amount of convective cooling to the air. Other considerations include maintaining a relatively kinematic constraint of the optic for best stability, which makes it desirable to have small points of contact. Very small points of contact, however, lead to relatively high compression stress in the polarizer, which may degrade the polarization quality. Accordingly, the permissible contact area of the pads may be highly application dependent. By way of example, but not limitation, the total contact area of the pads 220 on a sidewall of the tall Rochon polarizer may be between 1% and 5% of the area of the sidewall.

Figure 10:
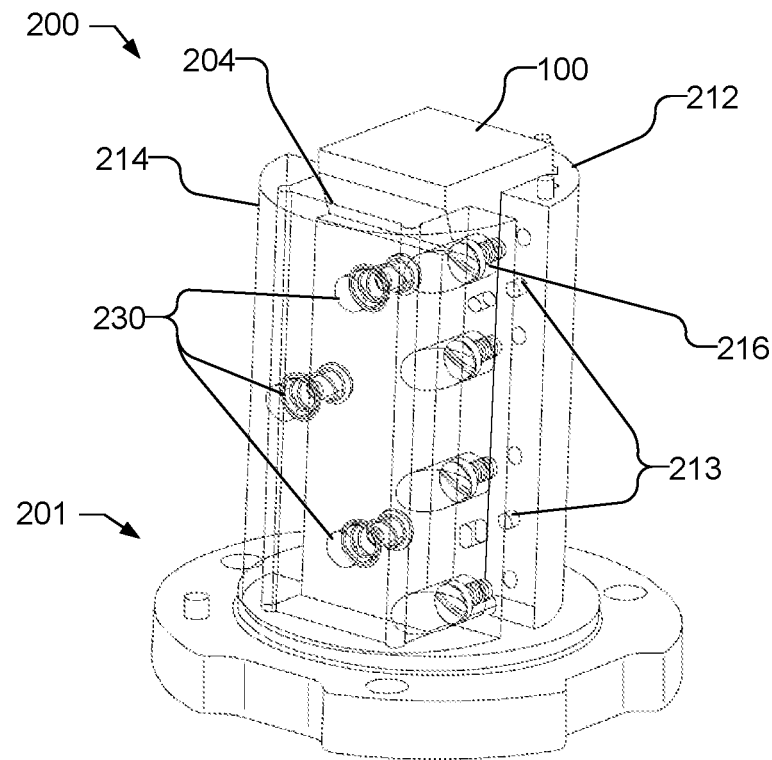
FIG. 10 illustrates a perspective view of the mounting assembly with a first plate being mounted to the base fixture.

FIG. 10 illustrates a perspective view of the mounting assembly 200 with the plate 214 being mounted to the plate 212. Plate 214 is illustrated as transparent in order to show the physical relationships between elements. The Rochon polarizer 100 may be temporarily held against the base fixture 201 (which includes the base 206 and the plate 212), while the plate 214, which includes a number of compression elements 230 in sidewall 204, is attached to the base fixture 201 with mounting screws 216. The plate 214 may be fitted to the base fixture 201 using mechanical alignment pins 213 to assure that the compression elements 230 on sidewall 204 will reside directly opposite pads 220 on sidewall 202.

Figure 11:
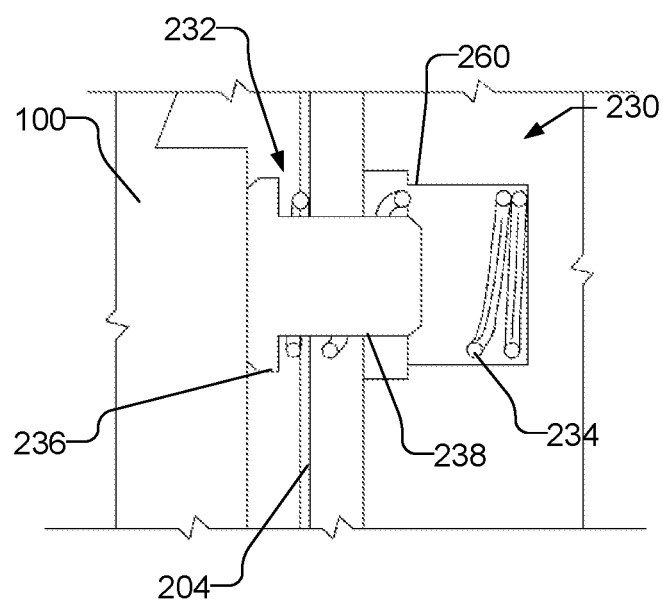
FIG. 11 illustrates a close-up cross section view of an example of a compression element that may be used in the mounting assembly.

FIG. 11 illustrates a close-up cross section view of an example of a compression element 230, comprising a button 232 and spring 234 positioned within a counterbore 260 in the sidewall 204. As illustrated, the button 232 may include a head portion 236 and a base 238 and the coil spring 234 surrounds the base 238 and is in contact with the head portion 236 and the bottom of the counterbore 260. The head portion 236 is in contact with the Rochon polarizer 100, which compresses the spring 234 between the head portion 236 and the bottom of the counterbore 260, so that the button 232 exerts a predictable amount of force on the Rochon polarizer 100 against the pad 220 (not shown in FIG. 11) that is on the opposite side of the Rochon polarizer 100. The force exerted on the pad 220 is determined by multiplying the spring rate (N/m) of the spring 234 with the amount of compression (m). Thus, by selection of a spring 234 with a desired spring rate and depth of the counterbore 260, the compression elements 230 may apply a desired amount of force to hold the Rochon polarizer 100 in a robust manner so that the polarizer is not easily dislodged from the mounting assembly, while preventing excessive forces from being applied to the Rochon polarizer 100 that may be harmful to the polarizer.

Further, as with the pads 220, the compression element 230 may have only a small contact area with the Rochon polarizer 100, thereby reducing the amount of thermal conduction while promoting air flow between the Rochon polarizer 100 and the sidewalls 204 and 205. Moreover, if desired, additional or fewer compression elements 230 may be used to exert the desired compression force on the Rochon polarizer 100. It may be desirable to use the same number of compression elements 230 as pads 220 and to position the compression elements 230 in opposition to the pads 220, i.e., at the same positions but on opposite sides of the Rochon polarizer 100.

Figure 12:
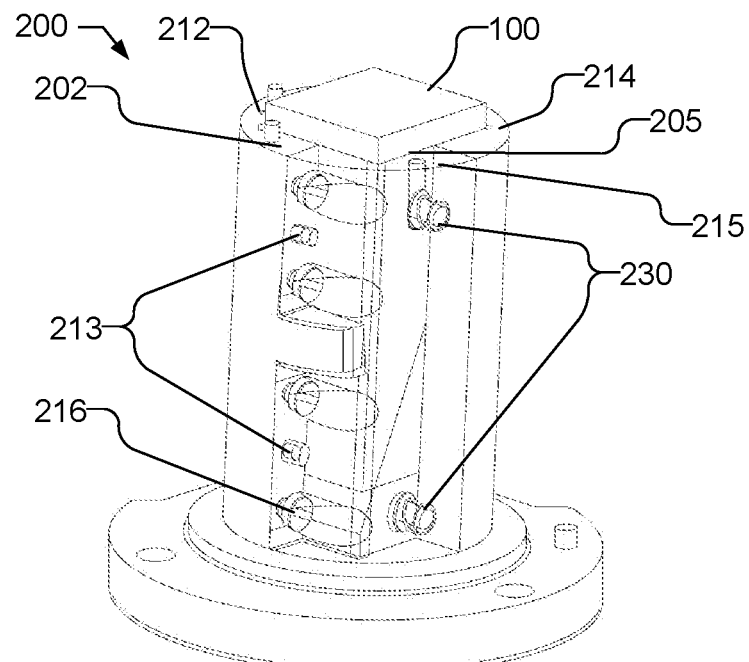
FIG. 12 illustrates a perspective view of the mounting assembly with a second plate mounted to the base fixture.

FIG. 12 illustrates a perspective view of the mounting assembly 200 with the plate 215 mounted to the plates 212 and 214. Plate 215 is illustrated as transparent in order to show the physical relationships between elements. Similar to the installation of plate 214, discussed above, plate 215, which includes a number of compression elements 230 in sidewall 205, may be attached to the plate 212 using mounting screws 216, and may be fitted to the base fixture 201 with mechanical alignment pins 213 to assure that the compression elements 230 in sidewall 205 will reside directly opposite pads 220 on sidewall 203. The sidewall 205 works with the same principle as sidewall 204, except that sidewall 205 is illustrated using only two compression elements 230. Thus, the buttons of the compression elements 230 press against the Rochon polarizer 100 and push directly opposite the pads 220 on sidewall 203 (not shown in FIG. 12). The forces applied by the springs of the compression element 230 in sidewall 205 may be controlled as described previously.

Figure 13:
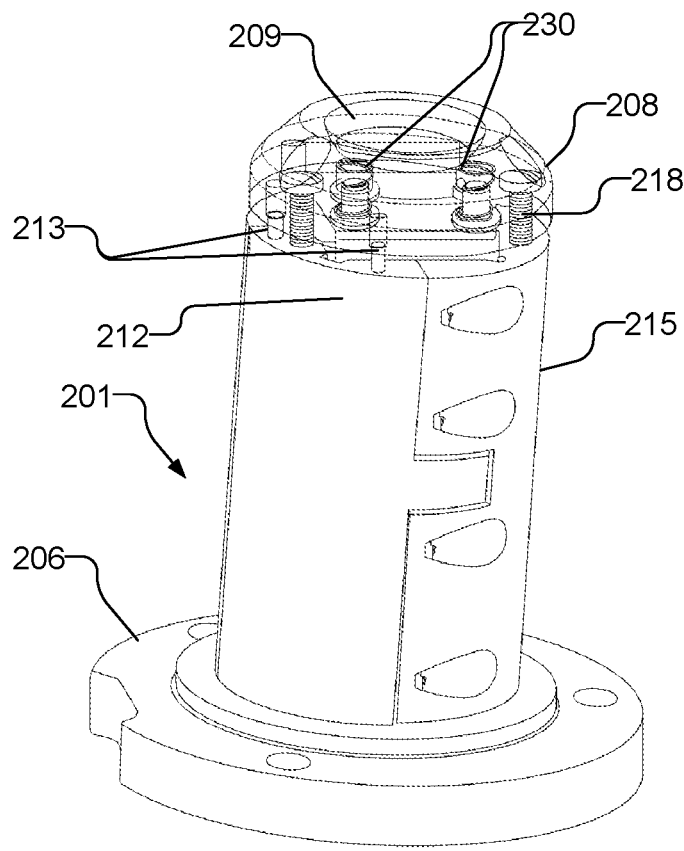
FIG. 13 illustrates a perspective view of the mounting assembly with a cap being mounted to the base fixture.

FIG. 13 illustrates a perspective view of the mounting assembly 200 with the cap 208 being mounted to the plates 212 and 215. Cap 208 is illustrated as transparent in order to show the physical relationships between elements. Similar to the installation of the plates 214 and 215, the compression elements 230 may be positioned within counterbores in the cap 208 and the cap 208 is placed on the distal end of the base fixture 201. Mechanical alignment pins 213 may be used to position the cap 208 so that the aperture 209 in the cap 208 is centered over the undeviated center ray of the Rochon polarizer 100. Thus, the aperture 209 in the cap 208 (as well as the aperture 207 in base fixture 201, which is not shown in FIG. 13) do not obstruct the undeviated center ray or the deviated ray of the Rochon polarizer 100. The mounting screws 218 secure the cap 208 to the base fixture 201. The pad 220 on the base 206 makes contact with the Rochon polarizer 100 opposite the buttons of compression element 230 in the cap 208, thereby completing the constrained enclosure of the Rochon polarizer 100. The forces applied by the springs of the compression element 230 in cap 208 may be controlled as described previously.

Each compression elements 230 may be selected to press the Rochon polarizer 100 against a corresponding pad 220 with a desired amount of force. The forces applied to the polarizer are necessarily light to avoid breaking the bonding of the prisms in the polarizer, but need to be sufficient to robustly hold the polarizer in the mounting assembly. By way of example, the compression elements may apply a force of 1 Newton or less. With such a force applied by the compression elements 230, the mounting assembly 200 may withstand a 20 g shock without dislodging the Rochon polarizer 100.

Figure 14:
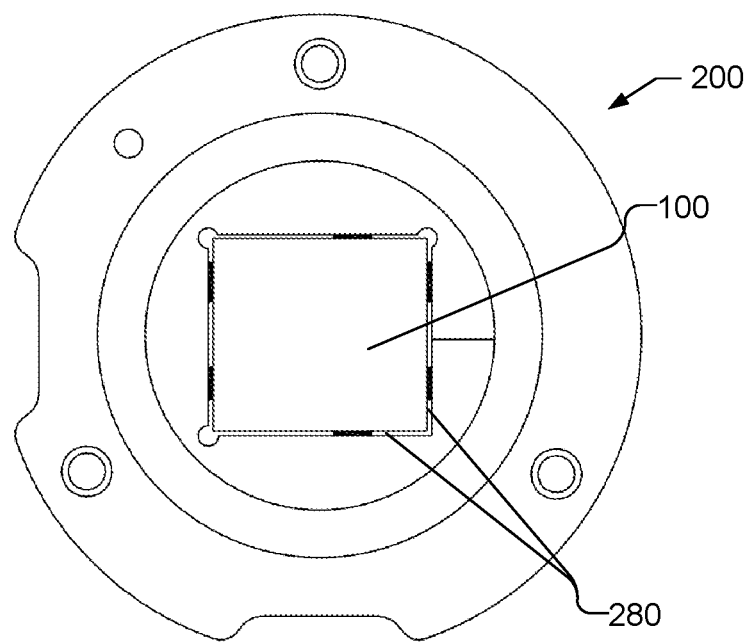
FIGS. 14 and 15 illustrate top and side cross section views, respectively, of the mounting assembly from FIG. 6 illustrating air gaps between the sidewalls of the mounting assembly and the Rochon polarizer.
Figure 15:
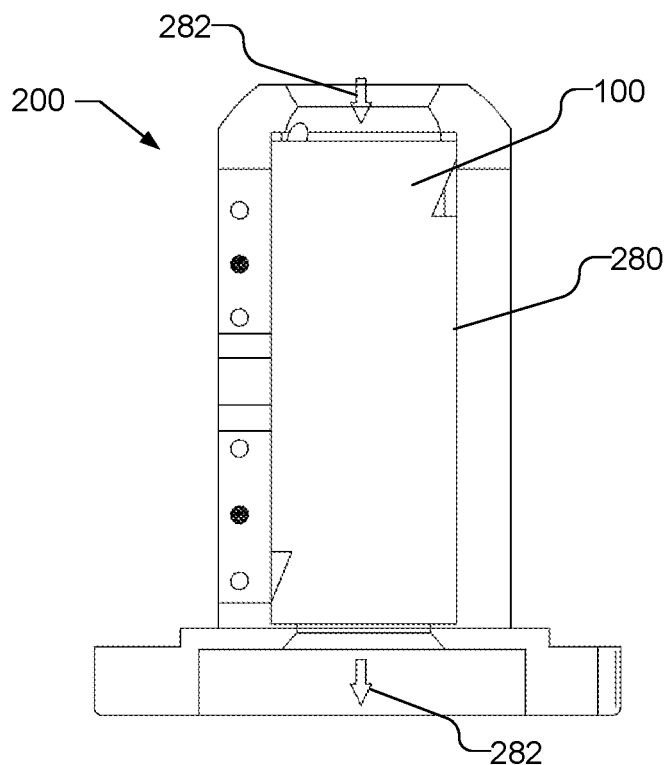

FIGS. 14 and 15 illustrate top and side cross section views, respectively, of the mounting assembly 200 illustrating an air gap 280 between the sidewalls of the mounting assembly 200 and the Rochon polarizer 100. As previously illustrated, the Rochon polarizer 100 may not contact with the sidewalls of the mounting assembly 200, but may only contacts the raised pads 220 that serve as datum A, B, and C and the opposing compression elements 230 producing an air gap 280 between the sidewalls and the Rochon polarizer 100. The air gap 280 is a poor heat transfer medium, thus protecting the Rochon polarizer 100 from external variations in temperature, including those that may occur during assembly, e.g., from the technicians hands. The air gap 280 also enables convection to occur by, for example, allowing air flow (illustrated by arrows 282), e.g., from the top of the mounting assembly 200 past the Rochon polarizer 100 and out the bottom of the mounting assembly 200. The air flow 282 carries accumulated heat with it as it flows past the Rochon polarizer 100. Air could alternately flow the opposite direction. Enabling air flow is distinct from adhesive mounting solutions for a tall polarizer as the amount of adhesive necessary to achieve an equivalently robust design without vibration of the polarizer would inhibit or prevent air flow.

Figure 16:
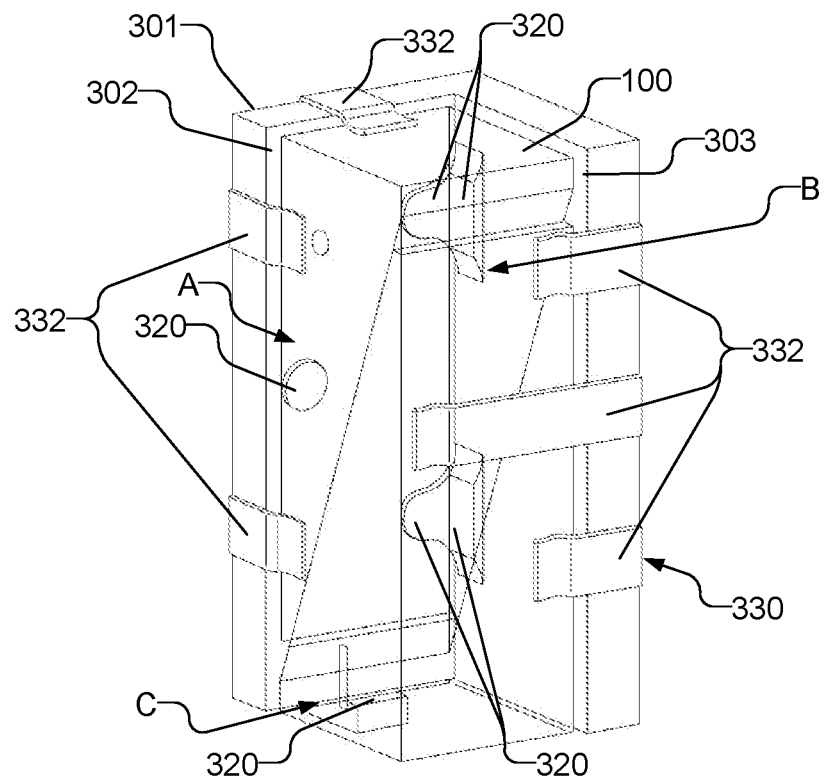
FIG. 16 illustrates a perspective view of another embodiment of compression elements that may be used in the mounting assembly.

FIG. 16 illustrates a perspective view of another embodiment of compression elements 330 holding the Rochon polarizer 100. The Rochon polarizer 100 is illustrated as transparent in order to show the physical relationships between elements. As illustrated, instead of the use of buttons and springs, the compression elements 330 may use leaf springs 332. The leaf springs 332 may be mounted to the base fixture 301 that includes sidewall 302 and 303, which also provide pads 320 to serve as the A, B, and C datums. The base fixture 301 may be mounted to or may be integral with a base of the mounting assembly. If desired, additional sidewalls and a cap may be used to encapsulate the Rochon polarizer 100 or the Rochon polarizer may only be partially encapsulated as illustrated in FIG. 16. The use of compression elements 330 securely hold the Rochon polarizer 100 without touching the walls of the Rochon polarizer 100 except in the critical areas described as datum A, B, and C, and in the juxtaposed compression elements. Thus, air gaps between the walls of the resulting mounting assembly and Rochon polarizer 100 and accompanying air flow is provided.

Figure 17:
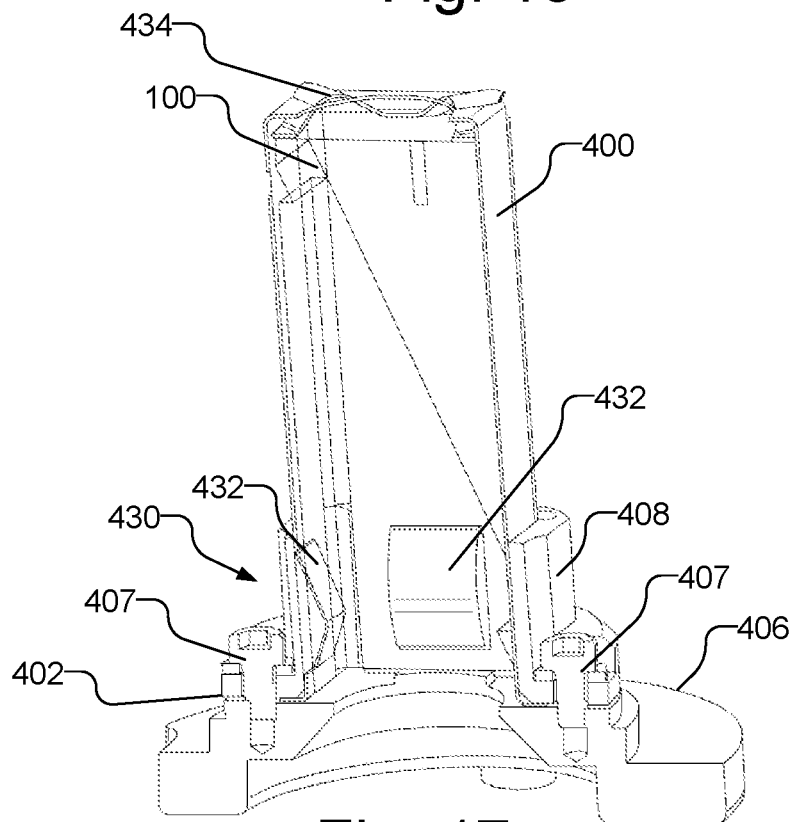
FIG. 17 illustrates a cross section view of another embodiment of compression elements that may be used in the mounting assembly.

FIG. 17 illustrates a cross section view of another embodiment of compression elements 430 holding the Rochon polarizer 100. The Rochon polarizer 100 is illustrated as transparent in order to show the physical relationships between elements. As illustrated, the Rochon polarizer 100 may be enclosed in a cage 400, which may be manufactured from, e.g., sheet metal, and which is mounted to a base 406 with a sleeve 408. The compression elements 430 are formed by internal leaf springs 432 of the cage 400, which may be integral to the cage 400, which presses the Rochon polarizer 100 against two of the cage sidewalls. The Rochon polarizer 100 is thus, held by the leaf springs 432 and the two opposite walls of the cage 400, which act as A and B datums, respectively. The Rochon polarizer 100 may additionally be pressed by a wavy spring 434, which may be a wavy washer or other appropriate spring such as another integral leaf spring, at one distal end of the polarizer against the surface of the base 406 upon which the Rochon polarizer 100 sits, which serves as the C datum. For assembly, for example, the Rochon polarizer 100 may be placed on the base 406 with a wavy spring 434 placed on top of the polarizer. The cage 400 may be placed over the Rochon polarizer 100 followed by the sleeve 408, which is slid down the outside walls of the cage 400 until the sleeve 408 compresses bottom tabs 402 of the cage 400 against the base 406. The sleeve 408 may be fitted to the base 406 using mechanical alignment pins (not shown) to provide proper alignment between the Rochon polarizer 100 and the base 406. Mounting screws 407 clamp the sleeve 408 to the base 406. The sleeve 408 may compress the cage 400 against the Rochon polarizer 100.

As illustrated in FIG. 17, the compression elements 430, however, provide air gaps between the cage 400 and the Rochon polarizer 100 to insulate and cool the Rochon polarizer. As illustrated, however, the walls of the cage 400 themselves may be the A and B datums and, thus, there may be no air gap between the polarizer and the sidewalls that serve as the A and B datums. However, the sheet metal of the cage 400 may be thin, e.g., only 0.2 mm thick, so that heat may be easily transferred through the metal, so that air passing around the outside of the cage 400 may also cool the polarizer.

Once fully assembled, the non-adhesive mounting assembly described herein provides an interchangeable assembly that allows the Rochon polarizer to be handled more easily for installation. For example, technicians wearing gloves may readily hold the mounting assembly without damaging the Rochon polarizer contained within, which is significant as the polarizer by itself cannot be handled with a gloved hand due to the risk of delamination from body heat. The detrimental impact of environmental heat and movement on the Rochon polarizer in the operating environment of an optical metrology device, however, is reduced or eliminated through the use of compression elements to robustly hold the polarizer while permitting air flow around the polarizer.

Figure 18:
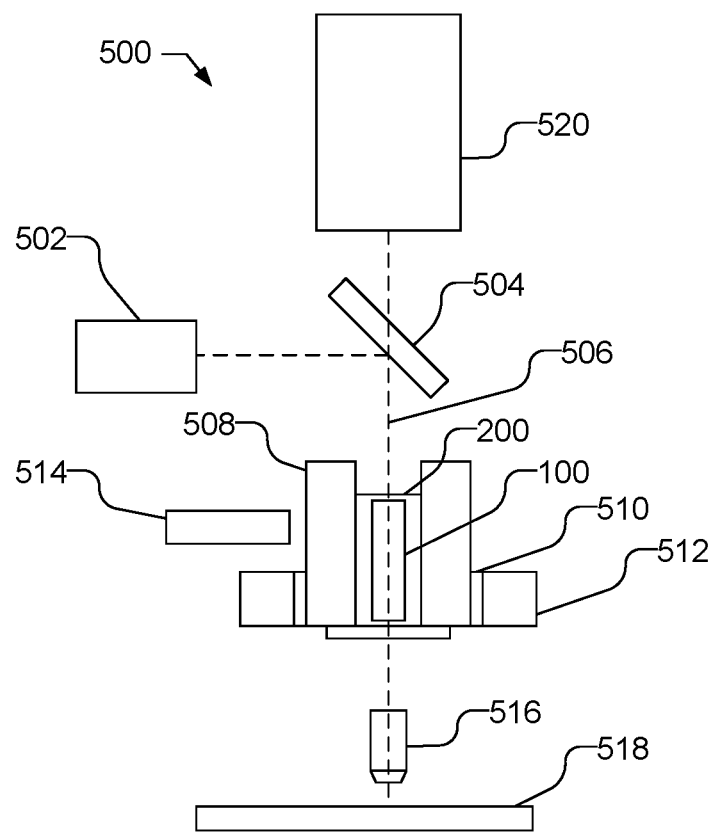
FIG. 18 illustrates a tall Rochon polarizer in a non-adhesive mounting assembly in an optical metrology device.

The tall Rochon polarizer 100 and non-adhesive mounting assembly may be used, e.g., in optical metrology device, e.g., to orient the polarization of light with respect to a grating or similar structure to be measured. FIG. 18, by way of example, illustrates a spectroscopic reflectometer 500 that includes a light source 502, such as a UV lamp, that generates a light beam that is partially reflected by a beam splitter 504 along the optical axis 506. The light beam pass through the tall Rochon polarizer 100, which is held in the non-adhesive mounting assembly 200. The mounting assembly 200 is held in a leveling assembly 508 that is used to level and align the Rochon polarizer 100 with the optical axis 506. A rotary bearing 510, rotary motor 512, and rotary encoder 514 are used to rotate the Rochon polarizer 100 and mounting assembly 200. Rotation of the Rochon polarizer 100 changes the polarization direction so that sample 518 may be measured at different polarization directions. The light beam is focused on the sample 518 by the objective lens 516. The beam is reflected off sample 518 and the reflected light is transmitted through objective lens 516 and Rochon polarizer 100. A portion of the reflected light is transmitted through beam splitter 504 and is received by a detector 520, which may detected the reflected light spectroscopically. The detector 520 produces signals in response to the received light, which may be analyzed to determine a desired characteristic of the sample 518.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus comprising:
  a Rochon polarizer that has a height dimension that is parallel with an undeviated center ray that passes through the Rochon polarizer;
  a mounting assembly that holds the Rochon polarizer so that the undeviated center ray and deviated rays passing through the Rochon polarizer are unobstructed, the mounting assembly comprising:
a plurality of sidewalls;
a base coupled to the sidewalls that covers a portion of a first end of the Rochon polarizer;
a cap coupled to the sidewalls that covers a second end of the Rochon polarizer, wherein the base and the cap of the mounting assembly include apertures through which light is transmitted through the Rochon polarizer;
a first set of reference points on a first sidewall that rigidly contact a first side of the Rochon polarizer;
a second set of reference points on a second sidewall that rigidly contact a second side of the Rochon polarizer;
a third set of reference points on the base that rigidly contacts the first end of the Rochon polarizer;
a first set of compression elements that rigidly contact a third side of the Rochon polarizer that is opposite the first side of the Rochon polarizer and press the Rochon polarizer against the first set of reference points;
a second set of compression elements that rigidly contact a fourth side of the Rochon polarizer that is opposite the second side of the Rochon polarizer and press the Rochon polarizer against the second set of reference points;
a third set of compression elements on the cap that rigidly contact the second end of the Rochon polarizer that is opposite the first end of the Rochon polarizer and press the Rochon polarizer against the third set of reference points on the base.

2. The apparatus of claim 1, wherein:
the first set of reference points are pads raised above the first sidewall providing an air gap between the first sidewall and the first side of the Rochon polarizer;
the second set of reference points are pads raised above the second sidewall providing an air gap between the second sidewall and the second side of the Rochon polarizer; and
the third set of reference points are pads raised above the base providing an air gap between the base and the first end of the Rochon polarizer.

3. The apparatus of claim 1, wherein:
the first set of compression elements is on a third sidewall of the mounting assembly, wherein there is an air gap between the third sidewall and the third side of the Rochon polarizer;
the second set of compression elements is on a fourth sidewall of the mounting assembly, wherein there is an air gap between the fourth sidewall and the fourth side of the Rochon polarizer; and
the third set of compression elements is on the cap of the mounting assembly disposed over the second end of the Rochon polarizer, wherein there is an air gap between the cap and the second end of the Rochon polarizer.

4. The apparatus of claim 3, wherein each compression element comprises a button and a spring that presses the button against the Rochon polarizer.

5. The apparatus of claim 3, wherein the first set of compression elements comprises at least one leaf spring that is integral with the third sidewall, the second set of compression elements comprises at least one leaf spring that is integral with the fourth sidewall, and the third set of compression elements comprises at least one spring between the cap and the Rochon polarizer.

6. The apparatus of claim 1, wherein each compression element comprises a leaf spring.

7. The apparatus of claim 1, wherein each of the first set, the second set, and the third set of reference points comprises one or more reference points; and each of the first set and the second set of compression elements comprises one or more compression elements.

8. The apparatus of claim 1, wherein each compression element produces a static force on the Rochon polarizer that is opposite and collinear with a static force produced on the Rochon polarizer by an opposing reference point on an opposite side of the Rochon polarizer.

9. The apparatus of claim 1, further comprising adhesive on the base to hold the Rochon polarizer to the base.

10. The apparatus of claim 1, wherein the apparatus comprises an optical metrology device.

11. An apparatus comprising:
a Rochon polarizer that has a height dimension that is parallel with an undeviated center ray that passes through the Rochon polarizer;
a mounting assembly that holds the Rochon polarizer, wherein the undeviated center ray and deviated rays passing through the Rochon polarizer are unobstructed by the mounting assembly, the mounting assembly comprising:
a plurality of sidewalls;
a base coupled to the sidewalls that covers a portion of a first end of the Rochon polarizer;
a cap coupled to the sidewalls that covers a second end of the Rochon polarizer, wherein the base and the cap of the mounting assembly include apertures through which light is transmitted through the Rochon polarizer;
a plurality of pads on at least two of the sidewalls and the base, the plurality of pads rigidly contacts at least a first side and a second side and the first end of the Rochon polarizer;
a plurality of compression elements on at least two of the sidewalls, the plurality of compression elements rigidly contacts at least a third side and a fourth side of the Rochon polarizer, and at least one compression element on the cap, wherein each compression element presses the Rochon polarizer against a corresponding pad to hold the Rochon polarizer in the mounting assembly;
wherein the plurality of pads and the plurality of compression elements hold the Rochon polarizer so that there are air gaps between the at least two sidewalls and the Rochon polarizer and between the base and the Rochon polarizer.

12. The apparatus of claim 11, wherein each pad and each compression element on a sidewall extends above a surface of the sidewalls to which it is attached to provide the air gaps between the at least two of the sidewalls and the Rochon polarizer.

13. The apparatus of claim 11, wherein each compression element comprises a button and a compression spring that presses the button against the Rochon polarizer.

14. The apparatus of claim 11, wherein each compression element comprises a leaf spring that presses against the Rochon polarizer.

15. The apparatus of claim 11, wherein at least a subset of the plurality of compression elements are integral with the at least two of the sidewalls.

16. The apparatus of claim 11, wherein each compression element produces a static force on the Rochon polarizer that is opposite and collinear with a static force produced on the Rochon polarizer by an opposing reference point on an opposite side of the Rochon polarizer.

17. The apparatus of claim 11, further comprising adhesive on the base to hold the Rochon polarizer to the base.

18. An apparatus comprising:
a Rochon polarizer that has a height dimension that is parallel with an undeviated center ray that passes through the Rochon polarizer;
a mounting assembly that holds the Rochon polarizer, wherein the undeviated center ray and deviated rays passing through the Rochon polarizer are unobstructed by the mounting assembly, the mounting assembly comprising:
a plurality of sidewalls;
a base coupled to the sidewalls that covers a portion of a first end of the Rochon polarizer;
a plurality of pads on at least two of the sidewalls and the base, the plurality of pads rigidly contacts at least a first side and a second side and the first end of the Rochon polarizer;
a plurality of compression elements on at least two of the sidewalls, the plurality of compression elements rigidly contacts at least a third side and a fourth side of the Rochon polarizer, wherein each compression element presses the Rochon polarizer against a corresponding pad to hold the Rochon polarizer in the mounting assembly;
wherein the plurality of pads and the plurality of compression elements hold the Rochon polarizer so that there are air gaps between the at least two of the sidewalls and the Rochon polarizer and between the base and the Rochon polarizer;
wherein the plurality of compression elements is on the same sidewalls as the plurality of pads.

19. A method of mounting a Rochon polarizer, the method comprising:
positioning the Rochon polarizer against a first set of reference points on a first sidewall of a mounting assembly, against a second set of reference points on a second sidewall of the mounting assembly, and against a third set of reference points on a base of the mounting assembly;
pressing the Rochon polarizer to rigidly contact the first set of reference points with a first set of compression elements of the mounting assembly and to rigidly contact the second set of reference points with a second set of compression elements of the mounting assembly, wherein the first set of compression elements and the second set of compression elements provide air gaps between the Rochon polarizer and the mounting assembly; and
pressing the Rochon polarizer against the third set of reference points with a third set of compression elements of the mounting assembly, wherein the third set of compression elements are on a cap of the mounting assembly and wherein the base and the cap of the mounting assembly include apertures through which light is transmitted through the Rochon polarizer.

20. The method of claim 19, wherein the first set of compression elements are on a third sidewall opposite the first sidewall of the mounting assembly and the second set of compression elements are on a fourth sidewall opposite the second sidewall of the mounting assembly.

21. The method of claim 19, further comprising bonding the Rochon polarizer to the base with adhesive.

22. The method of claim 19, wherein each reference point is raised to provide an air gap between the Rochon polarizer and the mounting assembly.

23. The method of claim 19, wherein each compression element comprises a button and a compression spring that presses the button against the Rochon polarizer.

24. The method of claim 19, wherein each compression element comprises a leaf spring that presses against the Rochon polarizer.

25. The method of claim 19, wherein the first set of compression elements and the second set of compression elements are on the first sidewall of the mounting assembly and the second sidewall of the mounting assembly.

26. The method of claim 19, wherein each of the first set, the second set, and the third set of reference points comprises one or more reference points; and each of the first set, the second set, and the third set of compression elements comprises one or more compression elements.

27. The method of claim 19, wherein pressing the Rochon polarizer against the first set of reference points with the first set of compression elements of the mounting assembly and against the second set of reference points with the second set of compression elements of the mounting assembly produces static forces between the reference points and corresponding compression elements that are opposite and collinear.

* * * * *